United States Patent

[11] 3,601,013

| [72] | Inventor | Victor N. Albertson |
| | | 4349 Browndale Ave., Minneapolis, Minn. 55424 |
| [21] | Appl. No. | 865,889 |
| [22] | Filed | Oct. 13, 1969 |
| [45] | Patented | Aug. 24, 1971 |

[54] FLUID MOTOR OR PUMP
8 Claims, 8 Drawing Figs.

[52] U.S. Cl. ................................................. 91/501
[51] Int. Cl. .................................................. F04b 1/02
[50] Field of Search ................................... 91/501–506

[56] References Cited
UNITED STATES PATENTS

| 1,925,378 | 9/1933 | Ferris et al. | 91/503 |
| 2,440,875 | 5/1948 | Renick | 91/504 |
| 3,249,020 | 5/1966 | Albertson | 91/501 X |
| 3,274,896 | 9/1966 | Terho | 91/472 X |

*Primary Examiner*—William L. Freeh
*Attorney*—Dugger, Peterson, Johnson & Westman

ABSTRACT: A fluid motor utilizing axially reciprocating pistons acting in power cylinders against cam type tracks to cause rotation to a rotor as the pistons are moved in and out by alternately subjecting them to pressure or relieving them of pressure. Alternatively, the device may be used as a motor when external power is applied to the carrying member and the cylinders are moved in and out to cause a pumping action. Self-aligning mounting plates for the cam tracks are provided to insure ease of alignment under all operations, without binding or causing excessive wear. Unique porting is also utilized and adjustability in one form of the invention is provided for wear on the exterior of the rotating member.

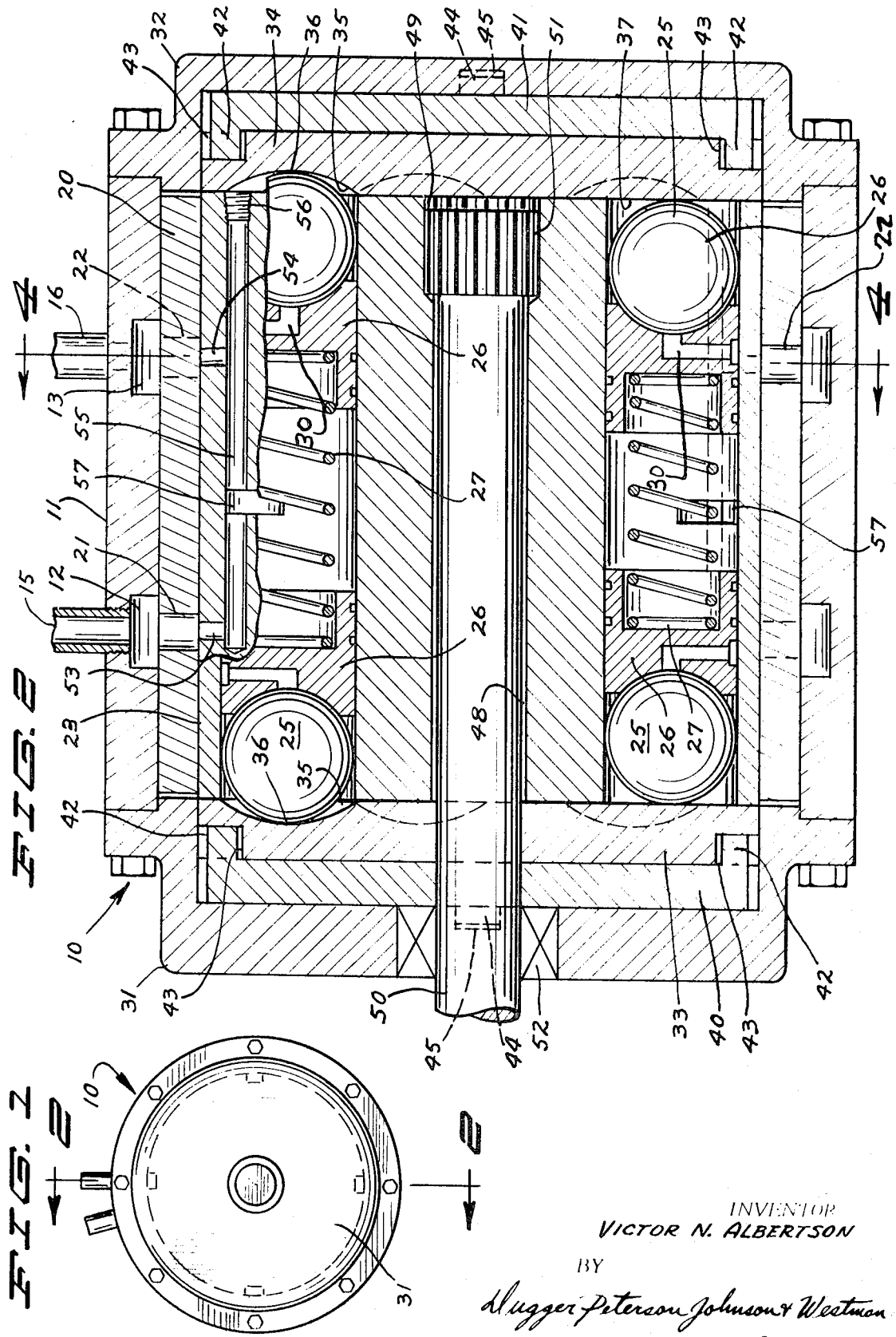

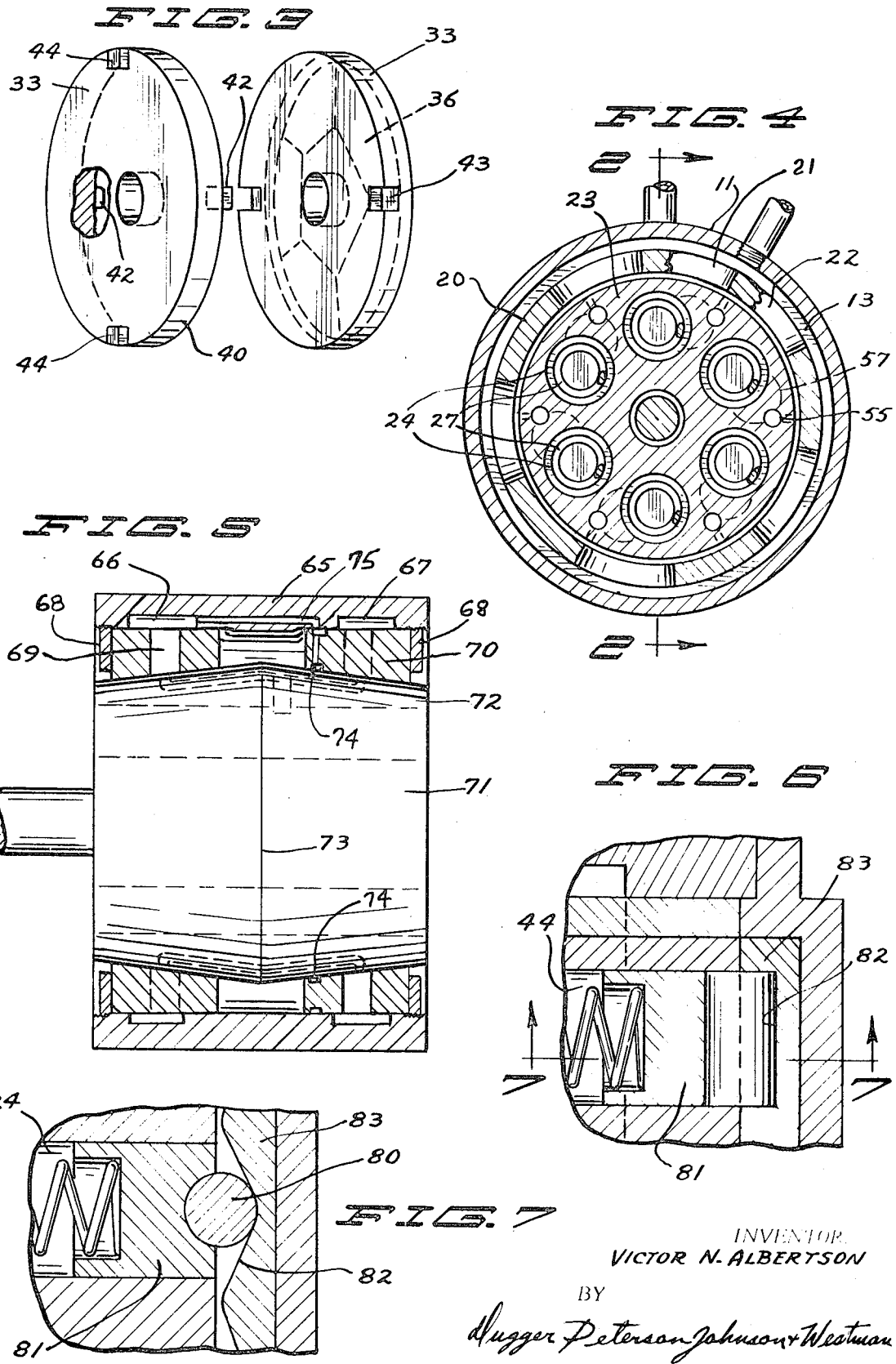

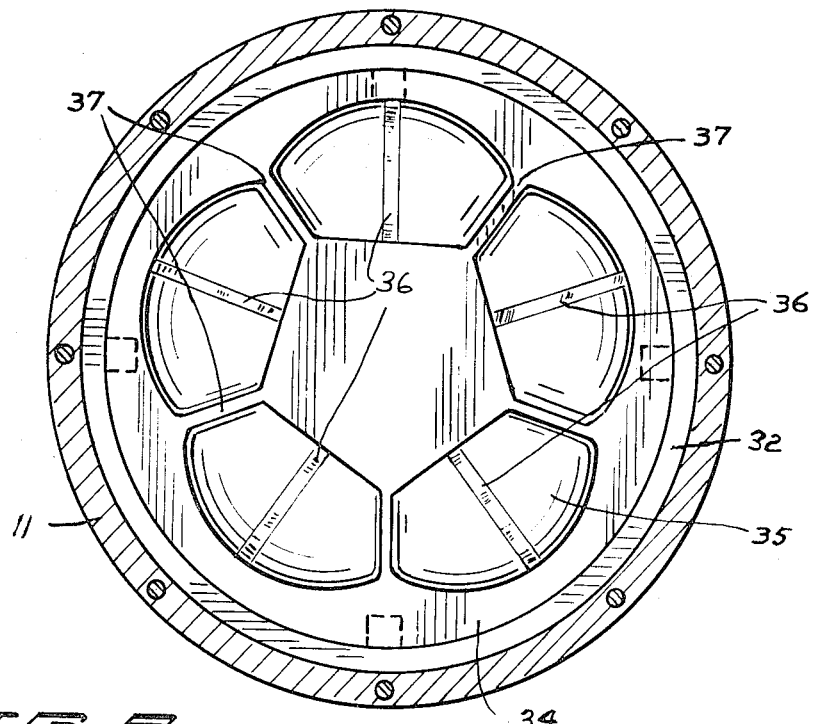

FLUID MOTOR OR PUMP

BACKGROUND OF THE INVENTION

1. Field of the Invention

The present invention has relation to rotating fluid devices which will operate either as a fluid pump or motor.

2. Prior Art

U.S. Pat. No. 3,249,020, issued to Victor N. Albertson on May 3, 1966, discloses a pump or motor of the general configuration and mode of operation of the present device. Certain improvements are presented herewith to permit ease of alignment of the cam members on the ends of the pump or motor as well as providing for adjustment of the main rotor assembly for wear. The pump or motor shown in U.S. Pat. No. 3,249,020 operates satisfactorily, and the improvements herein are to increase ease of manufacture of the device.

SUMMARY OF THE INVENTION

The present invention relates to a pump or motor which has end cam plates that are mounted to permit the cam plates to move slightly for self-alignment purposes and yet not rotate, and which has unique portion to minimize side thrust on the cylinder utilized for the rotating member. In addition, an alternate construction for adjusting for wear on the outer surface of the cylinder is shown. A unique power piston and cam configuration is shown as an alternate piston construction.

Further improvements relate to the porting of the device, and the pressure relief on the pistons themselves, as well as the unique mounting of the center rotating member on a splined coupling, so that only one end of the shaft used is mounted in bearings.

BRIEF DESCRIPTION OF THE DRAWINGS

FIG. 1 is an end view of the pump or motor made according to the present invention;

FIG. 2 is a sectional view taken along line 2—2 in FIG. 1 with parts in section and parts broken away;

FIG. 3 is a perspective view of a cam-mounting plate and a cam member showing the means by which the mounting plate permits movement of the cam member;

FIG. 4 is an end sectional view taken as on line 4—4 in FIG. 2;

FIG. 5 is a fragmentary sectional view of a rotor member showing a method of using outer commutator rings for adjustment of wear on the rotor utilized with the device of the present invention;

FIG. 6 is a fragmentary view of a modified form of a piston using a cylindrical roller and associated cam follower;

FIG. 7 is a fragmentary sectional view taken as on line 7—7 in FIG. 6; and

FIG. 8 is a plan view of a cam track used with the device of the invention.

DESCRIPTION OF THE PREFERRED EMBODIMENT

The fluid device 10, which for convenience of terminology will be referred to as a motor throughout the specification, but it is understood that the device will work as a pump also, if desired, includes an outer tubular housing 11 which is cylindrical in shape and has a circular cross section. On the inner surface of the housing a pair of annular internal grooves 12 and 13 are cut into the housing and open to the interior surface of the housing. These grooves in turn are connected through suitable ports to a pressure line 15 and a return line 16, respectively, which are connected to the source of fluid pressure if this unit is to be used as a motor, or can be connected to devices to which it supplies fluid pressure if the device is being used as a pump. A unitary tubular commutator valving ring 20 is press fitted into the interior of the outer housing 11. The ring is also tubular and circular in cross section. There are two sets of valve slots through the wall of the commutator annularly aligned along a radial plane in two positions thereof. These slots pass all the way through the wall of the commutator and comprise pressure slots 21 and return slots 22. The slots are made so that the device will be properly timed, and the pressure will be supplied to the cylinders at the proper time, or the cylinders will be opened to the return line at the proper time in order to insure operation of the device.

As shown, there are five of these valve slots spaced apart and positioned around the commutator for each of the pressure and return lines and the individual slots extend for substantially 36° of arc in order to give the correct timing. The pressure slots and return slots are angularly offset so that as the pressure to one of the cylinders is shut off the return slot will be opening to that cylinder.

A rotor assembly 23 is closely rotatably mounted inside the commutator ring. The fit on this assembly as shown is very close. The rotor assembly 23 also has a circular cross section and has a plurality of power cylinders 24 defined therein. These power cylinders 24 comprise axially extending cylindrical holes which are positioned radially from the axis of rotation of the rotor assembly, and extend all the way through the rotor parallel to the rotational axis of the rotor. As shown, there are six such cylinders evenly spaced around the periphery of the unit. In each of the cylinders 24 there are mounted two cam follower-pistons, one at each end. As shown, each of these cam follower-pistons comprise a ball member 25 mounted into a piston seat 26. The piston seat 26 is slidably mounted in its respective cylinder 24 and is a cylindrical member having a part spherical seal for the ball at its outer end. The pistons 26 at opposite ends of the power cylinders are urged outwardly in axial direction with a compression coil spring 27 mounted in provided receptacles 28 in each of the pistons. The center areas of the power cylinders between the pistons are open, as shown. The pistons for supporting the balls 25 each have a relief passageway 30 opening from the part spherical seat for the ball to the outer periphery of the pistons.

The tubular housing 11 is closed with a pair of end caps 31 and 32, respectively, which are fastened to the end surfaces of the housing 11. The end caps, as shown, have peripheral flanges through which capscrews pass, and these capscrews are threaded into the wall of the housing 11. The end caps are used for mounting cam end plates 33 and 34 at opposite ends of the housing. The cam end plates are positioned so that they are right at the end surfaces of the rotor assembly 23 and in sliding contact therewith or only slightly spaced therefrom. The cam end plates 33 and 34 are made so the surface facing the rotor has a plurality of depressions with high points in between forming an annular cam track for cooperation with the piston and balls 25. This cam track is shown in FIG. 8. As shown, it has five receptacles or pockets evenly spaced around the periphery. The cam track pockets 35 have center low areas 36 and high points or areas 37. The high points and low points are actually narrow nonactive surfaces. These nonactive surfaces between pockets and in the bottom of the pockets provide a dwell period in the strokes of the pistons. The dwell provides a nonactive area where the pistons are not moved axially as the rotor rotates which eliminates the need for extremely close tolerances between the angular position of the cam pockets, the cylinder axis, and the position of the valving ports. With a slight dwell at the ends of the piston strokes the porting between the commutator ring and the cylinders can be more easily timed to open and close at the proper points and eliminate freezing of the cylinder from improper timing.

The mounting of the cam plates 33 and 34 is done in a substantially different manner than that shown in said patent, however. In order to provide for some self-alignment and flotation, the cam plates 33 and 34 are each mounted to the end caps with separate connecting plates 40 and 41, respectively. The connecting plates are disclike members that fit into the recesses of the end covers, respectively, and on one surface thereof they have raised tongues or lugs 42 which mate with grooves 43 on the back sides of the cam plates 33 and 34, respectively. The lugs 42 are positioned 180° apart on this side of the plate. The lugs are made so that they mate fairly snugly with the side surfaces of the grooves 43 to prevent relative rotation between the ports but with some room so that the cam plates can slide with respect to the lugs in radial direction, or in other words in a plane perpendicular to the axis of rotation of the rotor. This gives some sliding movement for self-adjustability in a first direction for the cam plates 33 and 34.

Then, to complete the mounting of the cam plates to the end plates 31 and 32, the connector plates 40 and 41 each have provided tongues or lugs 44 integral with the plates and extending on the opposite side of each of the connector plate from the lugs 42. The lugs 44 are positioned 180° from each other and rotated 90° from the lugs 42. The lugs 44 fit within provided slots 45 formed in each of the end caps. The end cap slots 45 are also made so that the lugs fit snugly against the side surfaces of the slots, but are permitted to move slightly in radial direction. This means that the connector plates 40 and 41 cannot move annularly, but can slide in a plane radially relative to the end caps in one radial direction, as shown, and the cam plates can move radially relative to the connector plates. This in effect lets the cam plates move relative to the housing and rotor in sufficient directions to be self-centering.

The rotor assembly 23 has a central or axial opening 48, and one end thereof is splined with an internal spline shown at 49. A power shaft 50 is mounted through this opening, and has a splined end 51 that mates with the spline 49. The shaft ends short of the cam plate 34, but extends through a provided opening in the cam plate 33, and in alignment plate 40, and is mounted in a bearing 52 in the end cap 31. The support for the rotor 23 is acquired by a close fit with the commutator ring 20. The rotor is free to move within the limits of clearance between the internal surface of the commutator ring and the external surface of the rotor.

In order to provide valving or porting for fluid pressure to enter or exit from the lines 15 and 16, and the commutator slots 21 and 22, each of the cylinders 24 is provided with fluid communicating means comprising a first radial hole 53, and a second radial hole 54. The radial holes 53 and 54 are spaced from their corresponding cylinders. The holes 53 and 54 annularly align with the slots 21 and 22, respectively, so that as the rotor rotates, the holes 53 will sequentially open to each of the slots 21 and be closed between slots, and the holes 54 will sequentially open to slots 22. There is a separate radial hole 53 for each of the cylinders 24 and a separate radial hole 54 for each of the cylinders 24. Thus, there are six sets of radial holes. The radial holes 53 and 54 in the present form of the invention do not open directly into the cylinders 24, but rather each set of one hole 53 and one hole 54 communicates with a separate common passageway 55. Each of the passageways 55 (there is one for each of the cylinders 24) is comprised as a drilled hole drilled in from one end of the rotor, and dead ended just past the openings 53. The other end of the drilled hole for the passageway 55 is plugged with a suitable threaded plug 56 to seal the passageway. Then, to open a passageway to the corresponding cylinder 24, a rotary milling cutter is inserted into each of the power cylinders selectively, and the cutter is used to cut through the material of the rotor and form an opening from passageway 55 to the interior of its corresponding cylinders. This slot 57 is cut for each of the cylinders as can be seen in FIG. 2. The slots 57 thus provide for a communication of fluid from the pressure or return lines to the cylinders 24 through the timing commutator slots 21 and 22.

The mode and theory of operation of this device is exactly the same as for the device set forth in U.S. Pat. No. 3,249,020. Assuming the device is operating as a motor, fluid pressure is supplied through conduit 15, for example, and when the ball cylinders are aligned with the high points 37 of the cams, as shown in FIG. 2, the commutator slots 22 for the return side would have been open to that cylinder so that the balls could have moved in and force oil out of the particular cylinder 24 and out through the corresponding slot 57, passageway 55 and the radial hole 22 for the exhaust. When the balls are moving away from the high points toward the low points the associated cylinder will be open to the pressure source or line through a commutator slot 21. Pressure inside that cylinder 24 would be tending to force the pistons and balls outwardly and down the cam surface and thereby rotate the rotor. When the balls of that cylinder start to return into the cylinders as the rotor rotates, then the commutator slots are timed so that the pressure line will be closed off and the corresponding opening 54 will then communicate with the proper commutator opening 22 to permit oil to flow out of the described cylinder 24 as the pistons are squeezed together to prevent restraining movement of the pistons. The pistons are thus alternately cycled under pressure to expand them down along the cam ramps and cause rotation of the rotor, and are opened to exhaust ports to permit the balls to move in against the spring pressure and force the oil in those cylinders out through the slots 57, the passageway 55 and the radial openings 54 and the proper exhaust ports 22. Each of the pistons cycle five times for each revolution of the rotor. The cylinders 24 of course alternate in operation. Because there are only five cams and six cylinders at least one cylinder will be on a power stroke at all times to provide continuous rotation.

If power is supplied to the shaft 50, and the device is to be used as a pump, then the operation is reversed. The rotor 23 is rotated under power, and as the balls move in or roll out under pressure through the line 16 (the proper slot 22 will be open) and as the balls move down the ramps and move outwardly from the cylinders 24 the slots 22 and openings 53 will be open to permit oil to flow in through the line 15, and fill the cylinders. Then this oil that has filled the cylinders would be forced out under pressure in line 15 as the pistons again move together because the openings 53 will be closed off.

The use of the short radial holes 53 and 54 opening into a common passageway 55 and then through a slot 57 provides for less effective pressure area tending to force the rotor against one side of the commutator ring than the use of straight through radial holes opening directly into the cylinder 24.

A modified form of the rotor is shown in FIG. 5. Here, an outer housing 65 is used, and this would have inner annular grooves 66 and 67 just like rings 12 and 13 in the first form of the invention. The commutator 20 would be split into two sections. The two sections 69 and 70 are closely slidably mounted on the interior of the housing 65 and are kept from rotating with small stops (not shown). The commutator slots in the sections would serve the same function as before and would always communicate with the respective grooves 66 and 67 just as the commutator slots did in the first form of the invention. The position of the commutators can be adjusted with ring-type nuts 68 threaded in the ends of the housing.

A rotor 71 has an exterior surface 72 that is tapered from a midpoint 73 to the outer ends thereof with a slight angle. In other words, the end portions are shaped frustoconical. The inner surfaces of the commutators 69 and 70 are also shaped to have an internal frustoconical surface at the same angle, but as can be seen, the commutator rings are made so that their maximum diameter is smaller than the maximum diameter at midpoint 73. Then, by threadably adjusting the nuts 68 axially, the fit between the outer frustoconical surfaces 72 of the rotor 71 and the inner surfaces of the commutator sections 69 and 70 can be adjusted. If there is wear that occurs, the nuts 68 can be threaded inwardly farther with respect to the housing and can be thereby used to tighten the commutators to prevent the rotor from moving axially back and forth.

The rotor would operate against cam plates and use the connecting plates of the previous forms of the invention. The only difference would be that there would be an adjustment so that the fit along the outer surfaces can be adjusted by the use of complimentary frustoconical surfaces with the outer members (cups) being adjustably mounted in the housing 65 for this adjustment.

The commutators 69 and 70 themselves could be threaded, if desired, or held with different types of retainers. The use of separate retainer nuts makes proper angular adjustment of the valving slots in the commutators easier.

In using the tapered outer surface on the rotor, the pressure on the pressure side at the pressure ports causes an end thrust toward the opposite end. An annular internal pressure compensating groove 74 on the interior surface of commutator 70 opening through a passageway 75 to the pressure groove 66 will provide a balancing force. If the groove 67 is used as the pressure groove, the compensating groove would be on the interior of commutator 68. The area of groove 74 is calculated to balance the axial force from the pressure in the commutator slots 69 acting on the rotor.

A further modified cam track and piston arrangement is shown in FIGS. 6 and 7. The rotor is constructed in the same way as in the first form of the invention, but in place of having ball pistons, the pistons have at their outer ends cylindrical rollers 80 mounted in roller retainers 81 that are slidably mounted for movement back and forth and axially along the power cylinders 24. The cam track 81 is made so that it has cam surfaces 82 mating with these cylindrical rollers. The application for this type of cylinders is for relatively short axial length rollers to make the angle of operation relatively small so that the rollers will rotate fairly freely. In place of a point contact as you get with the use of a ball piston, the cylindrical roller piston will give line contact on the cam. The outer ends of the cylindrical pistons would have to move slightly more than the inner ends because of the greater annular distance the outer ends travel. Slightly conical rollers could be used to compensate for this difference in distance.

The disclosure here has dealt with six cylinders and five cam pockets. It is noted that different combinations of numbers between the cylinders and cams can be made. The cylinders and cams have to be unequal in number to obtain operation, however. For example, the six cylinders can be used with seven cam pockets, or five cylinders can be used with six cam pockets.

As stated previously, the valving slots or ports 21 and 22 are angularly offset from each other so that as one pressure port is closing off the opening 53 for a cylinder a return port 22 is uncovering the opening 54 for that same cylinder. The ends of the slots can overlap slightly. Thus the included angle of each of the slots from end to end would be slightly more than 36°. The timing of the ports is also discussed in U.S. Pat. No. 3,249,020. However, as shown with the dwell surfaces 36 and 37 (which are normal to the axis of the cylinders) acting as dwell spots, the problems associated with proper timing are greatly reduced. Also note that the commutator has been broken away in FIG. 4 to show the rearward valving shot 21 at the upper portion of the drawing.

Also while surfaces 37 are shown flat for cam dwell areas, the dwell portions of the cam at the low portion 36 of the pockets are curved slightly but still are normal or perpendicular to the axis of the cylinders where they contact the ball pistons. The dwell areas permit rotation of the rotor without actuation of the cylinders.

The surfaces 37 could also be curved to mate with the ball cylinders, but must be positioned with respect to the cylinder axis so the pistons don't move either in or out when they move across these dwell areas.

What is claimed is:

1. A pump or motor comprising an outer housing having end wall means at opposite ends thereof, a rotor rotatably mounted with respect to said end wall means, intake and exhaust means comprising a unitary commutator valving ring positioned around the outer periphery of the rotor and inside the housing, and including fluid openings defined therein, a plurality of axially extending openings in said rotor-forming power cylinders, means permitting each of said power cylinders alternately to communicate with the intake and exhaust means in said valving ring, piston means in each of said cylinders and slidably mounted therein, cam track means on at least one end of said housing, said cam track means cooperating with said piston means so that movement of the piston means axially in said cylinders and against said cam track means is related to rotational movement of said rotor, said cam track means having high areas and low areas comprising alternate depressions and high points between depressions, said cam track means including dwell portions in both the high areas and low areas wherein said piston means do not move axially in said cylinders for a portion of the rotational cycle of said rotor.

2. The combination as specified in claim 1 wherein said dwell portions in the high areas comprise planar surfaces joining adjacent depressions, said planar surfaces being substantially normal to the axis of rotation of said rotor.

3. A fluid pump or motor comprising an outer housing having closed ends, said outer housing having intake and exhaust openings, a cylindrical member rotatably mounted within said outer housing, said cylindrical member being provided with a plurality of longitudinally extending power cylinder openings spaced from the axis thereof, annular cam means on at least one end of said housing, piston means in each of said power cylinders cooperating with said cam means so that upon movement of said cylindrical member relative to said cam means the pistons cooperating with said cam means move in and out along the axis of their power cylinders, annular valve means to permit alternate communication with each of the power cylinders to the exhaust and intake openings, respectively, in proper timing with the movement of the piston means and the cam means, and passageways leading from each of said power cylinders comprising a separate axially extending first opening in said cylindrical member associated with each of said power cylinders, said each first opening being spaced from its associated power cylinder, a separate pair of second openings substantially radially extending from the outer surface of said cylindrical member to each of the first openings and positioned to be in alignment with the annular valve means, and a separate single connecting passageway connecting each of said first openings with its associated power cylinder, said single connecting passageway being located substantially midway between the ends of said associated power cylinder.

4. The combination of claim 3 wherein said cam means comprises high areas and low areas, and including dwell portions thereon wherein the pistons do not move axially in the power cylinders for a preselected amount of rotation of the cylindrical member.

5. A pump or motor comprising: an outer housing having end wall means at opposite ends thereof, a rotor rotatably mounted with respect to said end wall means, intake and exhaust means, including openings defined for permitting communication with said intake and exhaust means, a plurality of axially extending openings in said rotor-forming power cylinders, piston means in said cylinders sealingly slidably mounted therein, cam track means on at least one end of said housing, said cam track means cooperating with said piston means so that movement of said piston means axially in said cylinders and against said cam track is related to rotational movement of said rotor, and means mounting said cam track means with respect to said housing but permitting limited movement in a plane substantially at right angles to the axis of rotation of the rotor while said rotor is rotating in response to forces between said cam track means and said piston means.

6. The combination as specified in claim 1 wherein said means for mounting said cam track means comprises means defining a cooperating slot and tongue member on the cam track means and the mounting means.

7. The combination as specified in claim 1 wherein said means for mounting said cam track means comprises a separate platelike member, said platelike member being positioned between the end members of said housing and said cam track means, first cooperating slot and tongue means on the first side of said plate member between said cam track means and said plate member, said first slot and tongue means being positioned to prevent substantial annular movement of said cam track means with respect to said plate member but permitting radial movement along a first radial line, and second cooperating slot and tongue means between said end wall of said housing and said plate, said second cooperating slot and tongue means preventing substantial rotational movement between said plate member and said end wall, but permitting limited radial movement along a second line spaced from said first line.

8. In a fluid pump or motor having an outer housing, cam tracks at opposite ends of said housing, a rotor having a plurality of power cylinders therein positioned between said cam tracks and mounted for rotation with respect to said housing, piston means in said power cylinders adapted to cooperate with said cam tracks to move in and out of their power cylinders as the rotor rotates, and valve means to alternately connect said cylinders to first and second fluid pressure lines in proper timing with the position of the respective power cylinders and the cam tracks, the improvement comprising two frustoconical outer surfaces on said rotor, tapering outwardly from center portions thereof with the largest diameter of the rotor in the center portions thereof and separate adjustable means in said housing each having a frustoconical inner surface, mating with said outer surfaces whereby said adjustable means can be adjusted to change the clearance between said frustoconical inner surfaces and the outer surfaces of said rotor.